United States Patent Office 2,985,604
Patented May 23, 1961

2,985,604

SHAPED RESINS

James O. Koehler, Parma, Ohio, and Headlee Lamprey, Lewiston, N.Y., assignors to Union Carbide Corporation, a corporation of New York No Drawing. Filed Mar. 5, 1957, Ser. No. 643,935

2 Claims. (Cl. 260—23)

This invention relates to additives designed to improve the shaping of resins and plastics, and to forming methods using said additives.

Plasticizers of one type or another normally are incorporated in synthetic resins to increase their extrusion rates and to provide required properties in the finished article. Thus, for example, acryl nitrile rubbers which are used to aid in the extrusion of vinyl chloride type resins, also impart oil and grease resistance to these resins. Dimethyl phthalate, triphenyl and trioctyl phosphates are plasticizers often compounded with cellulose acetate and ethyl cellulose. In general, the exact amount and type of plasticizer or lubricant used depend on the resin formulation, the processing conditions and the physical properties required of the finished products. As a result, no additive compound or class of compounds may be said to function as a universal plasticizer or stabilizer for all resins.

The main object of this invention, therefore, is to provide plasticizers and stabilizers which are effective in all resinous systems.

An equally important object of this invention is to provide resin compositions having improved extrusion rates and superior physical properties, owing to the incorporation therein of certain organo-metallic derivatives of tin, lead, silicon and zirconium.

Another object of this invention is to provide improved resin extruding and injection molding processes.

The present invention by means of which the foregoing objects are realized is based on the discovery that small percentages of organo-metallic derivatives of tin, lead, silicon and zirconium markedly reduce the viscosity and surface tension of resins and plastics, thereby permitting faster shaping at lower temperatures and pressures, while also improving the physical properties of the finished shapes.

The organo-metallic compounds which modify resins and plastics as above indicated, are selected from the group consisting of the acylates of silicon, tin and lead; and the aminoalcohol and polyhydric alcohol derivatives of tin, lead, silicon and zirconium.

More specifically these additives are:

(1) Metal carboxylates having the formula

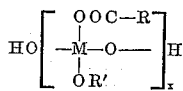

wherein M represents silicon, tin or lead; R is an aryl, alkaryl, aralkyl, alkyl or substituted alkyl group having from 10 to 18 carbon atoms; R' is an aryl, alkaryl, aralkyl, alkyl or substituted alkyl group having from 1 to 18 carbon atoms; and $x$ is a small integer. For example:

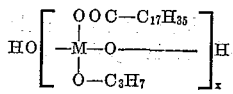

(2) Metal aminoalcohol derivatives having the formulae

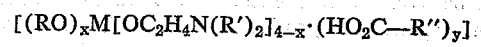

wherein M represents silicon, zirconium, tin or lead; R is an aryl, alkaryl, aralkyl, alkyl or substituted alkyl group having from 1 to 18 carbon atoms; R' is H, or aryl, alkaryl, aralkyl, alkyl or substituted alkyl group having from 1 to 4 carbon atoms; R" is an alkyl or a substituted alkyl group having from 10 to 18 carbon atoms; $x$ may be from 0 to 3; and $y$ equal to or less than $(4-x)$. For example:

$$(C_3H_7O)_2M[OC_2H_4N(C_2H_5)_2]_2 \cdot 2HO_2CC_{17}H_{35}$$

(3) Metal polyhydric alcohol derivatives having the formula

wherein M represents silicon, zirconium, tin or lead; R is an aryl, aralkyl, alkaryl or alkyl group having from 1 to 18 carbon atoms; R' is H, OH or an alkyl or substituted alkyl radical; R" is H or an alkyl or substituted alkyl and R''' is an alkalene group and $x$ is a number from 1 to 3. For example:

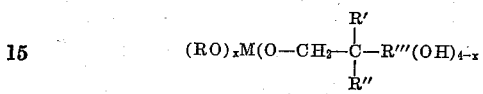

The above compounds may be prepared by any suitable method, e.g., the metal carboxylates can be prepared by reacting an organic ester having the formula $M(OR')_4$ with an aliphatic acid having the formula RCOOH, where R is a group having from 10 to 18 carbon atoms, followed by the vacuum distillation of the alcohol by-product. The metal aminoalcohol salt suitably can be prepared by refluxing an organic ester having the formula $(OR)_4M$ with an aminoalcohol. The resultant product then is shaken with a long chain aliphatic acid. To prepare the metal polyhydric alcoholates, an organic ester having the formula

$(RO)_4M$ is refluxed with a dehydroxy alcohol to provide the final product by transesterification.

The additives of the invention are described in greater detail together with their mode of preparation in the copending applications of H. Lamprey and J. O. Koehler, Serial No. 578,782, filed April 17, 1956, and Serial No. 629,797, filed December 21, 1956.

In the practice of the present invention, from 0.01 percent to 3.5 percent by weight of the above compounds are incorporated in typical resin formulations prior to the working thereof. Such incorporation may be effected generally in any known manner conventionally used to introduce additives or modifiers in resins.

The effect of some of these compounds on the surface tension of certain liquid resins, as determined with a Du Nouy tensiometer is given in Table I below.

TABLE I

| Surfactant and Amount Used | Surface Tension (Dynes/cm.²) in— | | |
|---|---|---|---|
| | Epoxy Resin | Phenolic Resin | Polystyrene |
| None | 55.3 | 46.3 | 32.5 |
| Isopropoxystearoxy Zirconate: | | | |
| 0.01% | 50.9 | 42.6 | 31.0 |
| 0.1% | 46.9 | 38.9 | 30.9 |
| Isopropoxystearoxy Silicate: | | | |
| 0.01% | 46.1 | 43.3 | 30.6 |
| 0.1% | 44.2 | 39.6 | 29.5 |

The lowering of the viscosity of certain resins occasioned by the incorporation therein of one percent of certain additives, as determined with a Brookfield viscosimeter, is given in Table II.

TABLE II

| Viscosity at 27° C. in Centipoises | | | Percent Lowering in Viscosity | Resin Type |
|---|---|---|---|---|
| No Additive | With 1% A [1] | With 1% B [1] | | |
| 8,000 | 6,000 | | 25 | Epoxy. |
| 800 | 500 | | 38 | Phenolic. |
| 340 | | 260 | 24 | Styrene. |
| 7,540 | | 3,900 | 48 | Styrene-acrylate. |

[1] Additive A is Diethoxy-di-(triethanolamine)-silicate. Additive B is Isopropoxy stearoxy polysilicate.

As illustrative of the successful practice of the invention, six additive compounds of the organo-metallic classes above indicated were incorporated in typical vinyl and phenolic resins. The effects of these additives on the "flow value" of thermosetting phenolic and thermoplastic vinyl resins were measured.

In the case of thermoplastic vinyl resins, the resin was ground through 10 mesh by the use of a Wiley rotary knife mill. Samples were prepared for measurements by adding ½ gram of each of the additives to separate 50 gram portions of the mill resin, followed by mixing with the aid of a mortar pestle. Additional mixing occurred when the test specimens were injection molded at a temperature of 325° F. to make pre-formed slugs ⅜ inch in diameter, and one inch in length for use in flow measurements.

The thermosetting phenolic resin samples were prepared by adding ½ gram of each additive to separate 50 gram portions of the resin. Test specimens ⅜ inch in diameter and 1 inch in length were pre-formed at room temperature at a pressure of 10,000 p.s.i. Flow test measurements were performed in a modified Rossi-Peakes apparatus, a constant force, vertical-orifice type machine consisting essentially of an orifice, block, charge chamber, ram and a pressure system. A split cone containing a vertical orifice ⅛ inch in diameter and 2¼ inches in length was clamped on to a steam heated block. Within the block, below the orifice and concentric with it, was arranged the charge chamber. The ram was so arranged that it applied pressure to the charge chamber from the bottom thereof, forcing material into the orifice. Pressure was applied by a mechanical system so arranged that the pressure applied to the ram was variable to furnish desired values. Heat was supplied by steam passing through a reducing valve and into the block. Temperature was controlled by regulating steam pressure.

"Flow value" for thermoplastic resins may be defined as the number of seconds required for the material to flow a specified number of inches. Relative effectiveness of the various additives of the invention expressed in the number of seconds (mean) required for the thermoplastic vinyl resin to flow 4¾ inches through a ⅛ inch orifice at 300° F. and 1400 p.s.i. is summarized in Table III below.

TABLE III

*Extrusion rates of thermoplastic vinyl resin at 300° F. and 1400 p.s.i. pressure*

| Additive Used (1 percent in each case) | Time to Extrude | | Seconds per inch |
|---|---|---|---|
| | 2.25" | 4.75" | |
| | Sec. | Sec. | |
| None | 43 | 84 | 16.4 |
| Diethoxy-di-(triethanolamine)-silicate | 35 | 55 | 8.0 |
| Diethoxy-di-(2-ethylhexanediol-1,3)-silicate | 41 | 82 | 16.4 |
| Di-(triethoxysiloxy)-glyceryl oleate | 40 | 77 | 14.7 |
| Diethoxy-di-(triethanolamine)-silicate-N-oleate | 36 | 56 | 8.0 |
| Diethoxy-di-(triethanolamine)-silicate-N,N-dioleate | 35 | 55 | 8.0 |
| Butoxy stearoxy polysilicate | 40 | 74 | 12.0 |

For thermosetting resins the flow number may be expressed as the number of inches of material extruded through a ⅛ inch orifice in two minutes at 275° F. and 1400 p.s.i. Relative effectiveness of the various additives expressed in terms of the length of the phenolic resin extruded through a ⅛ inch orifice in the indicated time, temperature and pressure is expressed in Table IV below.

TABLE IV

*Length of thermosetting phenolic resin extruded in 2 minutes at 275° F. and 1400 p.s.i.*

| Additive | Length, inches | Percent Increase |
|---|---|---|
| None | 2.14 | -- |
| 1% Diethoxy-di-(triethanolamine)-silicate | 2.34 | 9 |
| 1% Diethoxy-di-(2-ethylhexanediol-1,3)-silicate | 2.64 | 23 |
| 1% Di-(triethoxysiloxy)-glyceryl oleate | 2.82 | 32 |
| 1% Diethoxy-di-(triethanolamine)-silicate-N-oleate | 2.49 | 16 |
| 1% Diethoxy-di-(triethanolamine)-silicate-N,N-dioleate | 2.34 | 9 |
| 1% Butoxy stearoxy polysilicate | 2.59 | 21 |

The effect of the additives of the invention on injection molding of Vinylite, a copolymer of vinyl chloride and vinyl acetate having a softening point ranging from 140° F. to 170° F. polyethylene and ethocel, a thermoplastic ethyl cellulose having a melting point ranging from 200° F. to 210° F. was determined. In each case the minimum permissible molding pressure was reduced from 20 percent to 25 percent by the use of 1 percent of the additives. More important than the reduction in permissible pressure was the striking improvement in quality of the molded articles obtained with the aid of the additives. In each case the molded articles were completely free of imperfections or chips.

It was also determined that the addition of a small amount of the additive components greatly increased the adhesion of resins to waxes. The procedure used to make this determination was to take plastic rods of known cross-section and with smooth faces exactly normal to the rod length; to cement these rods together with molded candelilla wax containing the additives; and to measure, on a tensile test machine, the force required to break the resin-wax bond, and pull the rods apart. Table V below summarizes the effect of 2 percent additions of the additives of the invention on the adhesion of candelilla wax to resins. Depending upon the kind of wax involved, from 1 percent to upwards of 3.5 percent by weight of the additives will operate satisfactorily to increase the adhesion of the wax.

TABLE V

| Additive Used in the Wax | Break-point in p.s.i. | | |
|---|---|---|---|
| | Nylon | Lucite | Polystyrene |
| None | 82 | 77 | 66 |
| Tetra-(2-ethylhexanediol)-silicate | 189 | 224 | 82 |
| Diisopropoxy-(2-ethylhexanediol)-silicate | 316 | 306 | 77 |
| Diethoxy-di-(triethanolamine)-silicate-N-stearate | 408 | 434 | 123 |
| Diethoxy-di-(triethanolamine)-silicate-N,N-distearate | 449 | 286 | 66 |

Lucite is polymerized thermoplastic methyl methacrylate having a softening point between 190° F. and 240° F.

Another important effect of the organo-metallic compounds of the invention connected with their surface active behavior is their effect on the extrusion rates of carbon-resin mixtures, as indicated in Table VI below.

TABLE VI
Extrusion and baking of 35:100 resin-coke mixes [1]

| Percent Surfactant | Extrusion Temperature, °C. | Extrusion Pressure, p.s.i.g. | Apparent Density of Baked Rods | Rod Quality |
|---|---|---|---|---|
| | (low values are desired) | | | |
| 0.0 | 85 | 700 | 1.48 | Poor (die drag). |
| 0.4 | 90 | 200 | 1.51 | Excellent. |
| 0.6 | 90-98 | 110 | 1.48 | Do. |
| 2% oil [2] | 144 | 800-300 | 1.21 | Poor.[3] |

[1] Resin used was phenolic, thermosetting resin containing approximately 10-20 percent of hexamethylene tetramine.
[2] Conventional summer oil presently used for die lubrication; data given for comparison with our surfactant.
[3] Rod did not cure; abnormally low density obtained.

Carbon filled resins having 100 parts of coke per 35 parts of resin containing 0.4 part of isopropoxy stearoxy polystannate per 100 parts of resin, extruded at pressures equal to ¼ to ⅕ of those observed for coke-resin mixes containing no additive. The rods containing the additives were excellent in appearance, and exhibited bake densities equal to or higher than those of control rods.

From the disclosure given hereinabove, it will be apparent that the objects of the invention have been attained, and that there has been provided in accordance therewith, a series of organic compounds exhibiting surface active behavior in resinous systems.

What is claimed is:

1. A shapable, solid, organic material selected from the group consisting of the epoxy resins, the phenolic resins, styrene, styrene acrylate polymers, polystyrene, polyethylene and ethyl cellulose, modified in properties by the incorporation therein of from 0.01 percent to 3.5 percent by weight of at least one additive selected from the group consisting of the metal carboxylates having the formula:

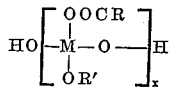

wherein M is a metal selected from the group consisting of silicon, tin and lead, R is a member selected from the group consisting of the aryl, alkaryl, aralkyl, alkyl and substituted alkyl radicals having from 10 to 18 carbon atoms, R' is a member selected from the group consisting of the aryl, alkaryl, aralkyl, alkyl and substituted alkyl groups having from 1 to 18 carbons and $x$ is a number ranging from 1 to 3; the metal aminoalcohol carboxylic acid salts having the formula:

$$(RO)_xM[OC_2H_4N(R')_2]_{4-x} \cdot (HO_2CR'')_y$$

wherein M is a metal selected from the group consisting of silicon, zirconium, tin and lead, R is a member selected from the group consisting of the aryl, alkaryl, aralkyl, alkyl and substituted alkyl radicals having from 1 to 18 carbon atoms, R' is a member selected from the group consisting of hydrogen, aryl, alkaryl, aralkyl, alkyl and substituted alkyl groups having from 1 to 4 carbon atoms, R'' is a member selected from the group consisting of the alkyl and substituted alkyl groups having from 10 to 18 carbon atoms, $x$ is a number ranging from 0 to 3, and $y$ is a number not greater than $(4-x)$ and the metal polyhydric alcohols having the formula:

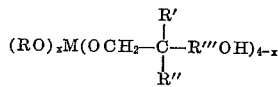

wherein M is a metal selected from the group consisting of silicon, zirconium, tin and lead, R is a member selected from the group consisting of the aryl, aralkyl, alkaryl, and alkyl groups having from 1 to 18 carbon atoms, R' is a member selected from the group consisting of hydrogen, hydroxyl and the alkyl and substituted alkyl radicals, R'' is a member selected from the group consisting of hydrogen and the alkyl and substituted alkyl radicals; R''' is a member selected from the group consisting of the alkylene and substituted alkylene groups and $x$ is a number ranging from 1 to 3.

2. A carbon-filled resin consisting essentially of about 35 parts by weight of a phenolic thermosetting resin containing from 10 to 20 percent by weight of hexamethylene tetramine and about 100 parts of coke, modified in properties by the incorporation therein of from 0.01 to 3.5 percent by weight of at least one additive selected from the group consisting of the metal carboxylates having the formula:

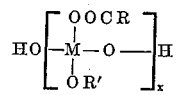

wherein M is a metal selected from the group consisting of silicon, tin and lead, R is a member selected from the group consisting of the aryl, alkaryl, aralkyl, alkyl and substituted alkyl radicals having from 10 to 18 carbon atoms, R' is a member selected from the group consisting of the aryl, alkaryl, aralkyl, alkyl and substituted alkyl groups having from 1 to 18 carbons and $x$ is a number ranging from 1 to 3; the metal aminoalcohol carboxylic acid salts having the formula:

$$(RO)_xM[OC_2H_4N(R')_2]_{4-x} \cdot (HO_2CR'')_y$$

wherein M is a metal selected from the group consisting of silicon, zirconium, tin and lead, R is a member selected from the group consisting of the aryl, alkaryl, aralkyl, alkyl and substituted alkyl radicals having from 1 to 18 carbon atoms, R' is selected from the group consisting of hydrogen, aryl, alkaryl, aralkyl, alkyl and substituted alkyl groups having from 1 to 4 carbon atoms, R'' is a member selected from the group consisting of the alkyl and substituted alkyl groups having from 10 to 18 carbon atoms, $x$ is a number ranging from 0 to 3, and $y$ is a number not greater than $(4-x)$ and the metal polyhydric alcohols having the formula:

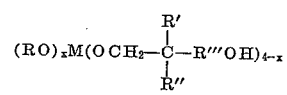

wherein M is a metal selected from the group consisting of silicon, zirconium, tin and lead, R is a member selected from the group consisting of the aryl, aralkyl, alkaryl, and alkyl groups having from 1 to 18 carbon atoms, R' is a member selected from the group consisting of hydrogen, hydroxyl and the alkyl and substituted alkyl radicals, R'' is a member selected from the group consisting of hydrogen and the alkyl and substituted alkyl radicals; R''' is a member selected from the group consisting of the alkylene and substituted alkylene groups and $x$ is a number ranging from 1 to 3, said additives being characterized by their ability to reduce the viscosity and surface tension of said material, thereby permitting faster shaping thereof at low temperatures and pressures.

References Cited in the file of this patent

UNITED STATES PATENTS

| | | |
|---|---|---|
| 2,462,331 | Myers | Feb. 22, 1949 |
| 2,476,307 | Klein et al. | July 19, 1949 |
| 2,615,006 | Lane | Oct. 21, 1952 |
| 2,621,193 | Langkammerer | Dec. 9, 1952 |
| 2,634,285 | Rust et al. | Apr. 7, 1953 |
| 2,681,922 | Balthis | June 22, 1954 |
| 2,708,203 | Haslam | May 10, 1955 |
| 2,824,114 | Bostwick | Feb. 18, 1958 |
| 2,885,419 | Beinfest et al. | May 5, 1959 |

(Other references on following page)

OTHER REFERENCES

"The Chemistry of Synthetic Resins," volumes I and II, by Ellis (1935), pages 346 and 461, published by Reinhold Publishing Co. (New York.)

Dupont Titanium Organics, Titanium Acylates, Bulletin A 504 2a–1500, 10–53, pages 1–3, Dupont Pigments Dept., Wilmington, Del., 1953.

Chem. and Eng. News, Titanium Organics Show Progress, pages 4226, 4228, October 3, 1955.